(12) United States Patent
Iwabuchi

(10) Patent No.: US 8,151,521 B2
(45) Date of Patent: Apr. 10, 2012

(54) VEHICLE DOOR STRUCTURE

(75) Inventor: Masaaki Iwabuchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 295 days.

(21) Appl. No.: 12/584,736

(22) Filed: Sep. 11, 2009

(65) Prior Publication Data
US 2010/0064591 A1 Mar. 18, 2010

(30) Foreign Application Priority Data

Sep. 18, 2008 (JP) ................................ 2008-239755

(51) Int. Cl.
*B60J 5/04* (2006.01)
(52) U.S. Cl. ..... 49/502; 49/475.1; 49/490.1; 296/146.9; 296/146.2; 296/152
(58) Field of Classification Search .................... 49/502, 49/475.1, 490.1; 296/146.9, 146.2, 152
See application file for complete search history.

(56) References Cited

U.S. PATENT DOCUMENTS

| 4,653,230 | A | * | 3/1987 | Seo et al. ......................... 49/502 |
| 4,903,436 | A | * | 2/1990 | Rouillard ........................ 49/440 |
| 5,261,721 | A | * | 11/1993 | Conger et al. ........... 296/146.15 |
| 5,317,835 | A | * | 6/1994 | Dupuy et al. .................... 49/441 |
| 5,743,047 | A | * | 4/1998 | Bonne et al. .................. 49/490.1 |
| 6,103,168 | A | * | 8/2000 | Kelly .............................. 264/259 |
| 6,220,650 | B1 | * | 4/2001 | Davis et al. .............. 296/146.16 |
| 6,416,113 | B1 | * | 7/2002 | Page .......................... 296/146.2 |
| 6,729,674 | B2 | * | 5/2004 | Davis et al. .............. 296/146.16 |
| 6,880,293 | B2 | * | 4/2005 | Ishikawa et al. ................ 49/414 |
| 2008/0116713 | A1 | * | 5/2008 | Jun et al. ..................... 296/146.2 |

FOREIGN PATENT DOCUMENTS

| JP | 05-105007 | 4/1993 |
| JP | 2008-126997 A | 6/2008 |

* cited by examiner

*Primary Examiner* — Katherine W Mitchell
*Assistant Examiner* — Marcus Menezes
(74) *Attorney, Agent, or Firm* — Carrier Blackman & Associates, P.C.; William D. Blackman; Joseph P. Carrier

(57) ABSTRACT

Vehicle door structure includes: a door body openably and closably mounted to a vehicle body; a door sash provided on the door body and including a vertical sash section extending in a vertical direction of the door body, and an upper sash section formed continuously with an upper end portion of the vertical sash section and bent relative to the vertical sash section; and a garnish provided on the door sash and including a base section covering the vertical sash section and fixed to the vertical sash section, an extension section formed continuously with an upper end portion of the base section, bent relative to the base section and covering the upper sash section, and an engaging section provided on the extension section and engaging with the upper sash section.

8 Claims, 5 Drawing Sheets

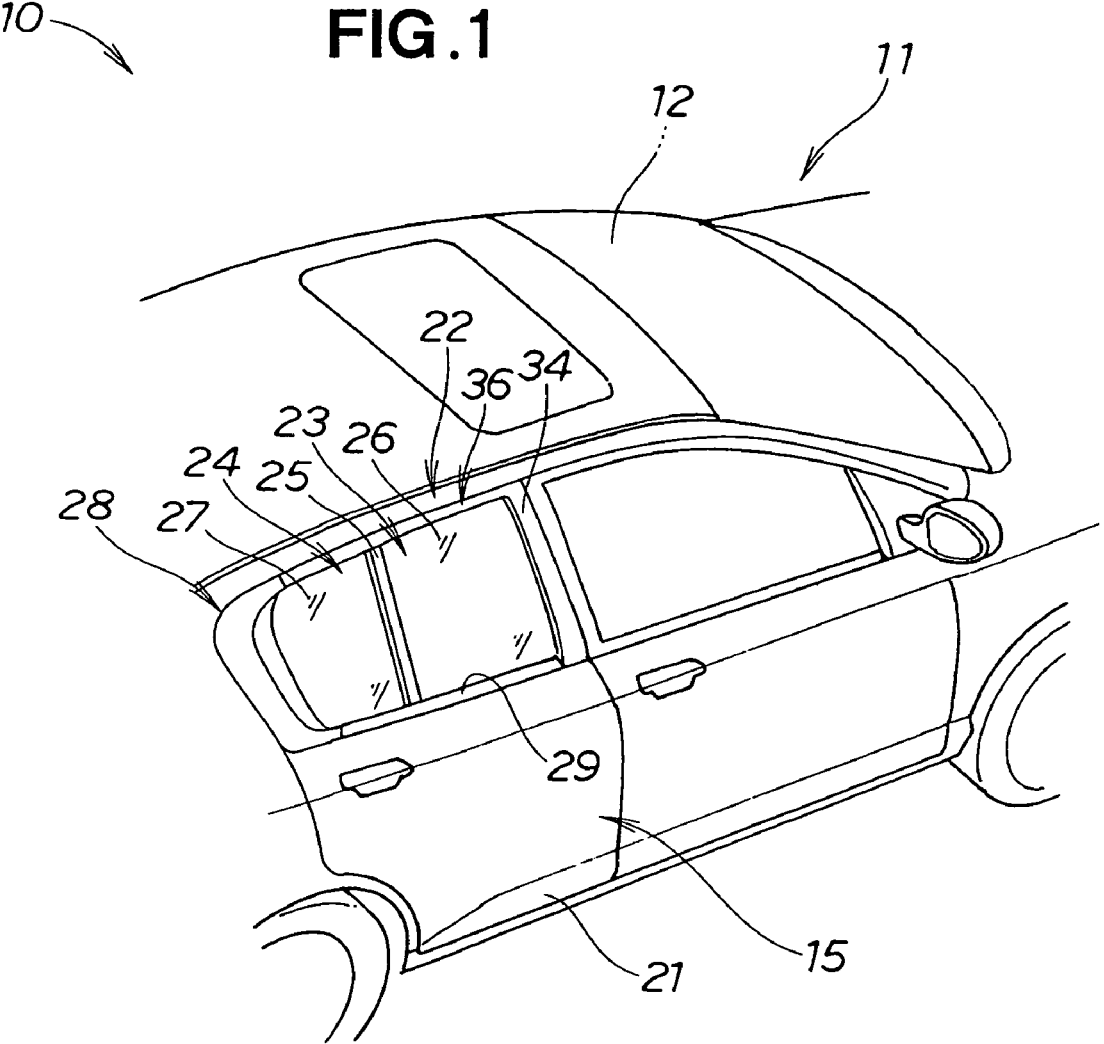

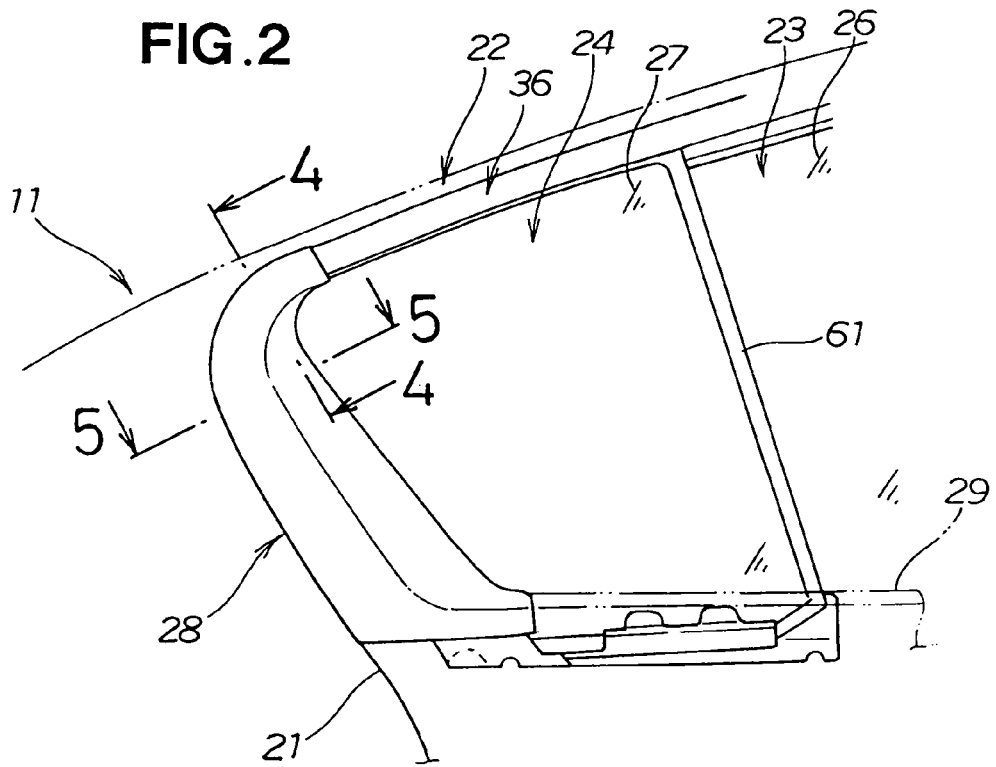
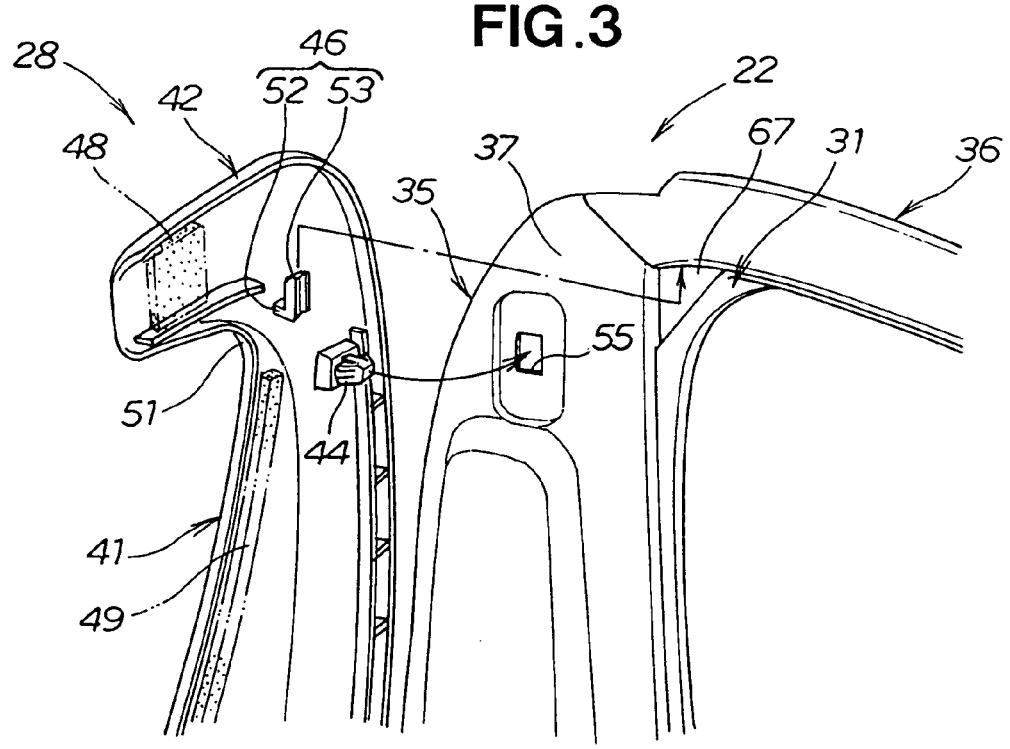

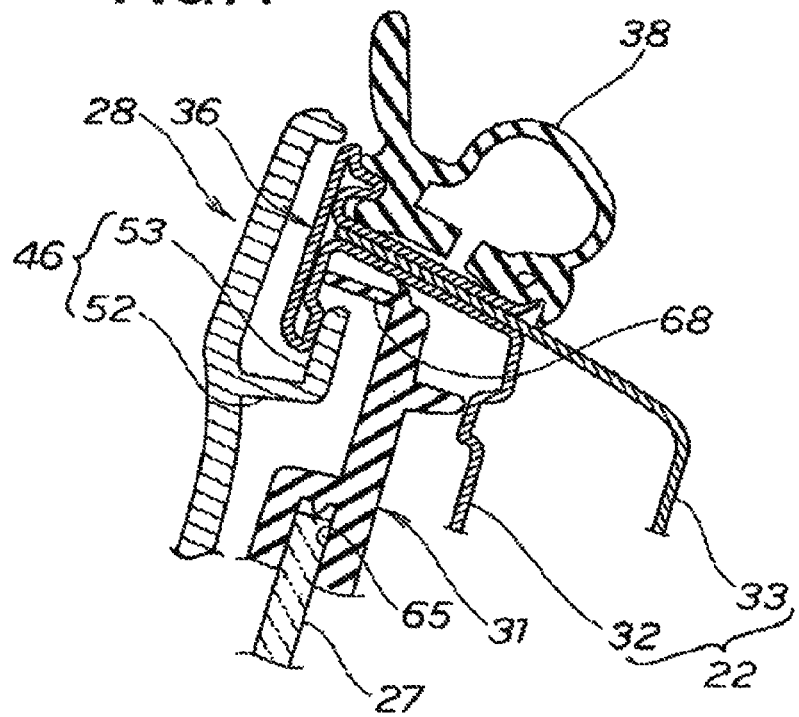
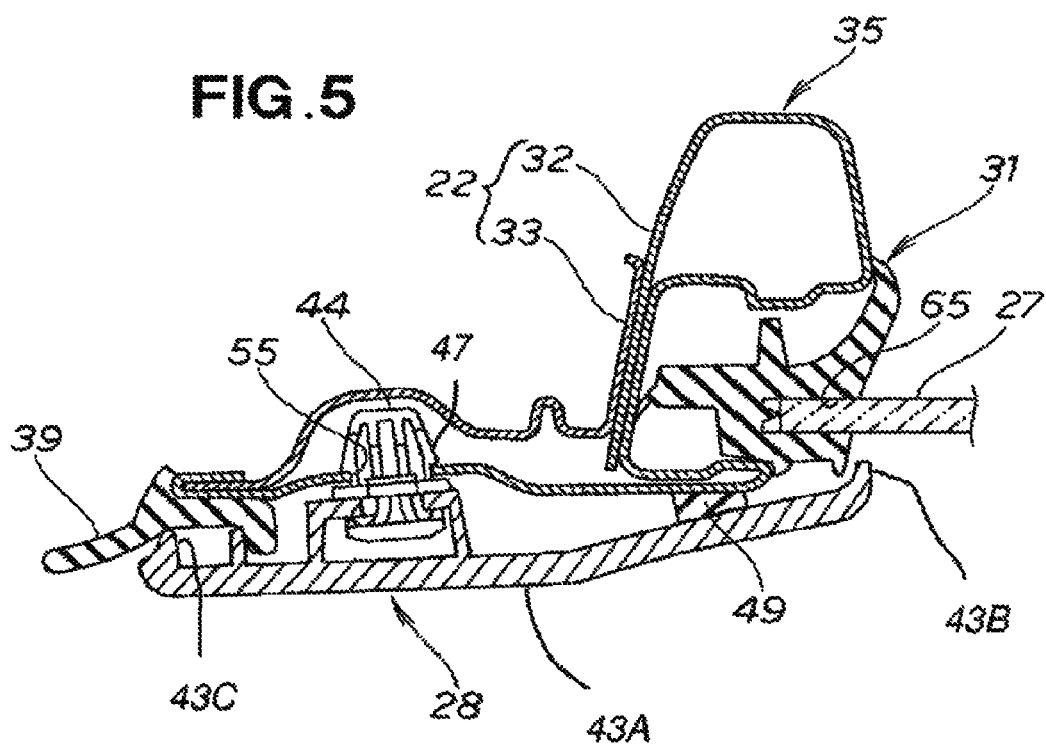

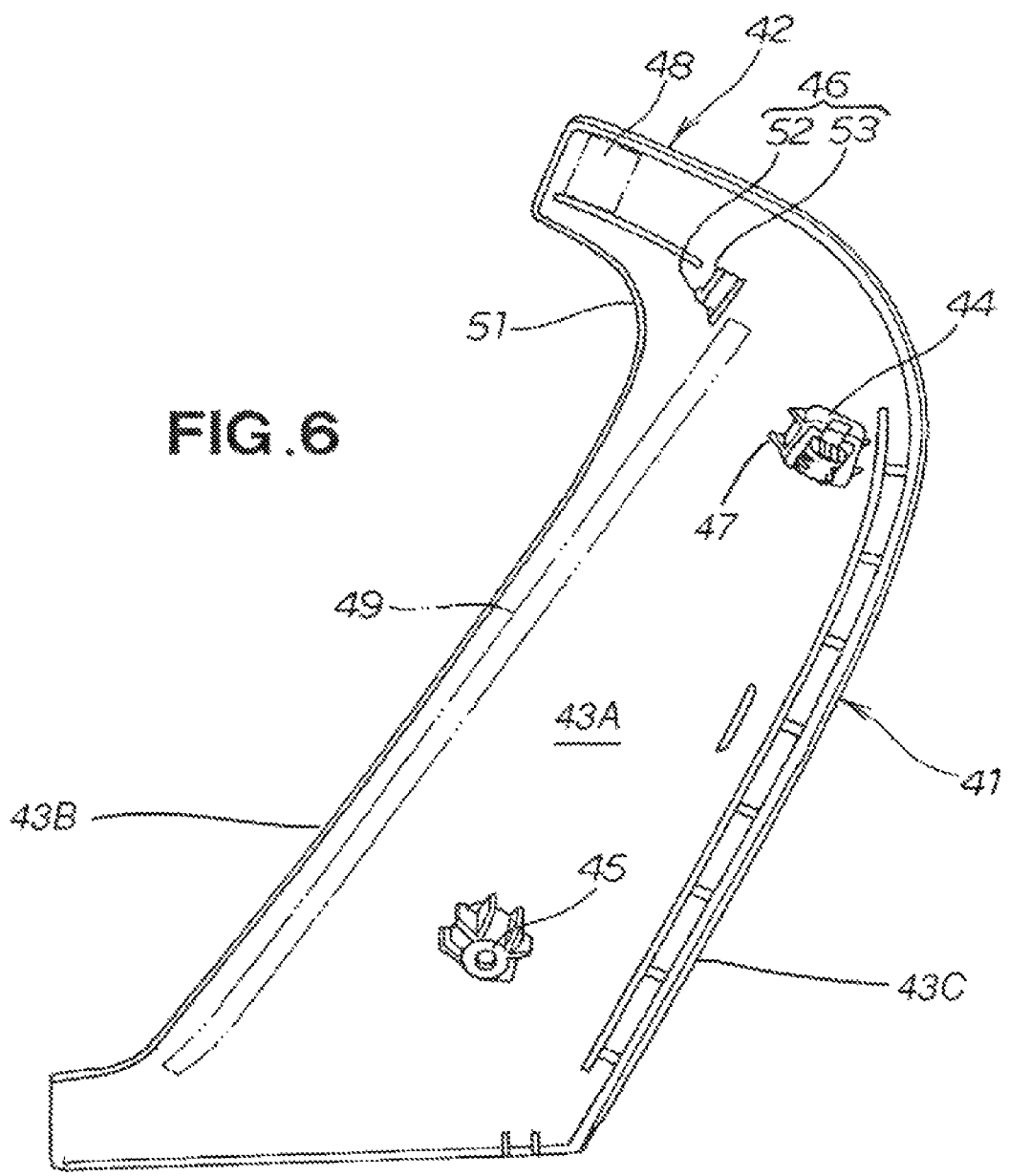

VEHICLE DOOR STRUCTURE

FIELD OF THE INVENTION

The present invention relates to vehicle door structures in which a door glass is mounted in a door sash via a sealing member and in which the door sash is covered with a garnish.

BACKGROUND OF THE INVENTION

Among the conventionally-known vehicle door structures are ones in which a door sash is covered with a garnish from outside a vehicle compartment to achieve an enhanced outer appearance of the vehicle. Also known are vehicle door structures in which a pillar is covered with a garnish from inside a vehicle compartment, one example of which is disclosed in Japanese Patent Application Laid-Open Publication No. HEI-5-105007 (JP 05-105007 A).

In the vehicle door structure disclosed in JP 05-105007 A, a roof lining (molded ceiling) has a flange extending horizontally from its sides, and this horizontal flange has an engaging section engaging with a vehicle-body-side pillar (more specifically, inner pillar panel). The engaging section has an engaging hole having inserted therein of an upper end portion of a pillar garnish that covers the pillar, and a body section of the pillar garnish is fixed to the pillar.

The aforementioned pillar garnish, which covers the vehicle-body-side pillar from inside the vehicle compartment, is generally of a rectangular shape. If the garnish is formed in a substantially inverted L shape by having at its upper end an extension section extending in a front-rear direction of the vehicle, it is desirable that the garnish be fixed with a good outer appearance by unwanted uplift of the extension section being effectively prevented.

SUMMARY OF THE INVENTION

In view of the foregoing prior art problems, it is an object of the present invention to provide an improved vehicle door structure in which a door glass is mounted in a door sash via a sealing member and the door sash is covered with a garnish from outside the vehicle, and in which, if the garnish is formed in a bent or L shape, allows the garnish to be fixed with a good outer appearance by preventing unwanted uplift of an extension section of t1.

In order to accomplish the above-mentioned object, the present invention provides an improved vehicle door structure, which comprises: a door body openably and closably mounted to a vehicle body; a door sash provided on the door body, the door sash including a vertical sash section extending in a vertical direction of the door body, and an upper sash section formed continuously with an upper end portion of the vertical sash section and bent relative to the vertical sash section; and a garnish provided on the door sash, the garnish including a base section fixed to the vertical sash section to cover the vertical sash section, an extension section formed continuously with an upper end portion of the base section, bent relative to the base section and covering the upper sash section, and an engaging section provided on the extension section and engaging with the upper sash section.

Thus, even in the case where the garnish has a bent shape, the garnish can be mounted with an enhanced mounting strength because the base section is fixed to the vertical sash section and the engaging section engaging with the upper sash section is provided on the extension section, and with a good outer appearance because the extension section is effectively prevented from uplifting from the vertical sash section.

Preferably, the engaging section is provided on the extension section adjacent to a corner portion defined between the base section and the extension section. This inventive arrangement can further enhance the mounting strength of the garnish.

Preferably, the door sash further includes a sealing member not only mounting therein a fixed door glass but also sealing the fixed door glass, and the sealing member has a recessed section having at least a distal end portion of the engaging section received therein. This inventive arrangement can secure stable engagement between the door sash and the garnish.

Preferably, the recessed section is formed in a generally triangular shape across a connecting portion between the vertical sash section and the upper sash section. This inventive arrangement can reliably prevent interference between the engaging section and the sealing member even when an assembling deviation has occurred.

Preferably, the sealing member abuts against the upper sash section above the engaging section. This inventive arrangement can secure sealability between the door sash and the garnish despite the provision of the engaging section on the extension section of the garnish Preferably, the engaging section includes a projection portion projecting, in a width direction of the vehicle, toward the upper sash section, and a claw portion bent upwardly, in a height direction of the vehicle body, from the projection portion toward the upper sash section. The projection portion is formed in spaced apart relation to the upper sash section, and the engaging section engages with the upper sash section from outside the vehicle in such a manner that the claw portion abuts against the inner surface of the upper sash section. This inventive arrangement can effectively prevent unwanted uplift of the extension section of the garnish and effectively absorb any assembling deviation occurring in the engaging section.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will be described in detail below, by way of example only, with reference to the accompanying drawings, in which:

FIG. 1 is a perspective view of a vehicle employing an embodiment of a vehicle door structure of the present invention;

FIG. 2 is a side view of an embodiment of the vehicle door structure of FIG. 1;

FIG. 3 is an exploded view of the embodiment of the vehicle door structure shown in FIG. 2;

FIG. 4 is a sectional view of the embodiment of the vehicle door structure taken along line 4-4 of FIG. 2;

FIG. 5 is a sectional view of the embodiment of the vehicle door structure taken along line 5-5 of FIG. 2;

FIG. 6 is a side view of a garnish employed in the vehicle door structure shown in FIG. 2;

DETAILED DESCRIPTION OF THE PREFERRED EMBODIMENTS

Figure 7:
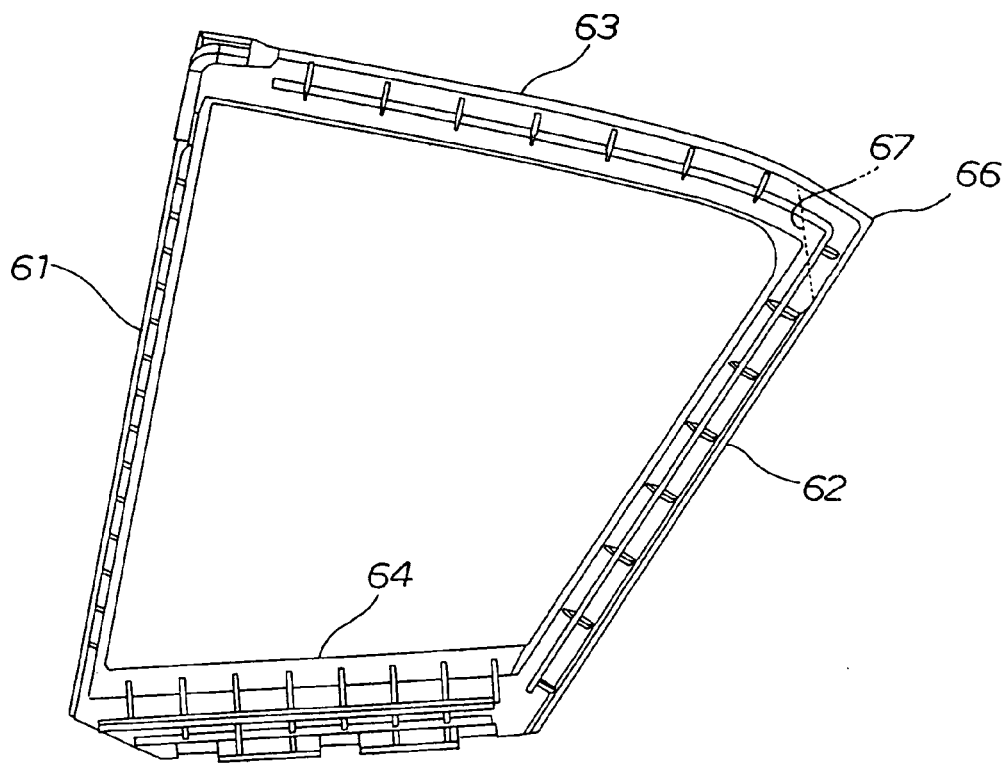
FIG. 7 is a side view of a sealing member employed in the vehicle door structure shown in FIG. 2.

Reference is now made to FIG. 1 showing in perspective a vehicle employing an embodiment of a vehicle door structure of the present invention. The vehicle 10 includes a door (rear door in this case) 15 openably and closably mounted to a vehicle body 11 so as to allow a passenger to get in and out of a vehicle compartment 12.

The door (rear door) 15 includes: a door body 21 openably and closably mounted to the vehicle body 11 via hinges (not shown); a belt line molding 29 provided on an upper edge portion of the door body 21; a door sash 22 of a generally gate shape provided on the upper end edge of the door body 21; a quarter sash 25 spanning between an upper portion of the door sash 22 and the door body 21 to partition a space, surrounded by the door sash 22 and the door body 21, into a front space 23 and a rear space 24; a window glass 26 vertically movably mounted in the door body 21 for covering the front space 23; a quarter glass (i.e., fixed door glass) 27 mounted in the rear space 24, surrounded by the door sash 22, quarter sash 25 and door body 21, via a sealing member 31 (see FIG. 4); and a garnish 28 covering respective rear portions of the quarter glass 27 and door sash 22 from outside the vehicle.

FIG. 2 is a side view of the embodiment of the vehicle door structure shown in FIG. 1, FIG. 3 is an exploded view of the embodiment of the vehicle door structure shown in FIG. 2, FIG. 4 is a sectional view of the embodiment of the vehicle door structure taken along the 4-4 line of FIG. 2, and FIG. 5 is a sectional view of the embodiment of the vehicle door structure taken along the 5-5 line of FIG. 2.

The vehicle door structure includes: the above-mentioned door body 21 openably and closably mounted to the vehicle body 11; the door sash 22 provided on the door body 21; the quarter sash 25 defining the front space 23 and the rear space 24; the sealing member 31 of a generally rectangular shape provided in the rear space 24; the quarter glass (fixed door glass) 27 fitted in the sealing member 31; and the garnish 28 covering a rear vertical sash section 35 of the door sash 22.

As shown in FIGS. 4 and 5, the door sash 22, which comprises a pair of outer and inner sashes 32 and 33, includes a front vertical sash section 34 extending vertically downward from a front upper portion of the door body 21 (see FIG. 1); a rear vertical sash section 35 extending vertically downward from a rear upper portion of the door body 21; and an upper sash section 36 interconnecting the respective upper ends of the front and rear vertical sash sections 34 and 35.

The door sash 22 further includes weather strips 38 and 39 for preventing entry of rainwater into the vehicle compartment 12. As shown in FIGS. 3 and 4, the upper sash section 36 is formed continuously with upper end portions of the front and rear vertical sash sections 34 and 35 and bent relative to the front and rear vertical sash sections 34 and 35.

FIG. 6 is a side view of the garnish 28 which is one component part of the vehicle door structure shown in FIG. 2. Generally, as seen in FIGS. 5 and 6, the garnish includes a main plate portion 43A and two opposed edge portions 43B, 43C which are turned inwardly in relation to the main plate portion. The garnish 28 includes two primary sections, which are a base section 41 covering the rear vertical sash section 35 and an extension section 42 formed continuously with an upper end portion of the base section 41 and bent relative to the base section 41 to extend upwardly therefrom. The garnish 28 also includes a fitting section 44 provided on the inner surface of the main plate portion 43A on the base section 41, and provided for fitting in a hole 55 formed in the rear vertical sash section 35. As seen best in FIG. 5, the fitting section 44 has opposed engaging tabs 47 formed thereon for engaging a wall of the rear vertical sash section, and for retaining the fitting section in place therein. The garnish 28 further includes a mounting section 45, provided on the inner surface of the main plate portion 43A on the base section 41 and attached to the rear vertical sash section 35; and an engaging section 46, provided on the inner surface of the main plate portion 43A on the extension section 42 and engaging with the upper sash section 36.

Namely, the garnish 28 is not only fixed at the base section 41 to the rear vertical sash section 35, but also engaged at the extension section 42 with the upper sash section 36. As necessary, packing members 48 and 49 are provided in the garnish 28 to absorb vibration.

More specifically, the engaging section 46 is provided adjacent a corner portion 51 defined between the base section 41 and the extension section 42, and it includes a projection portion 52 that projects, in a width direction of the vehicle, toward the upper sash section 36, and a claw portion 53 that is bent upwardly, in a height direction of the vehicle body 11, from the projection portion 52 to the upper sash section 36. The projection portion 52 is vertically spaced apart from the upper sash section 36 as shown in FIG. 4, and the claw portion 53 abuts against the inner surface of the upper sash section 36; that is, the engaging section 46 engages with the upper sash section 36 from outside the vehicle in such a manner that the claw portion 53 abuts against the inner surface of the upper sash section 36.

Because the engaging section 46 is provided adjacent to the corner portion 51 defined between the base section 41 and the extension section 42 of the garnish 28, the garnish 28 can be mounted with an enhanced mounting strength.

Because the engaging section 46 includes the projection portion 52 that projects, in the width direction of the vehicle, toward the upper sash section 36 and the claw portion 53 that is bent upwardly, in the height direction of the vehicle body 11, from the projection portion 52 to the upper sash section 36, and because the projection portion 52 is spaced apart from the upper sash section 36 and the engaging section 46 engages with the upper sash section 36 from outside the vehicle in such a manner that the claw portion 53 abuts against the inner surface of the upper sash section 36, the instant embodiment can effectively prevent unwanted uplift of the extension section 42 of the garnish 28 and effectively absorb any assembling deviation occurring in the engaging section 46.

Figure 8:
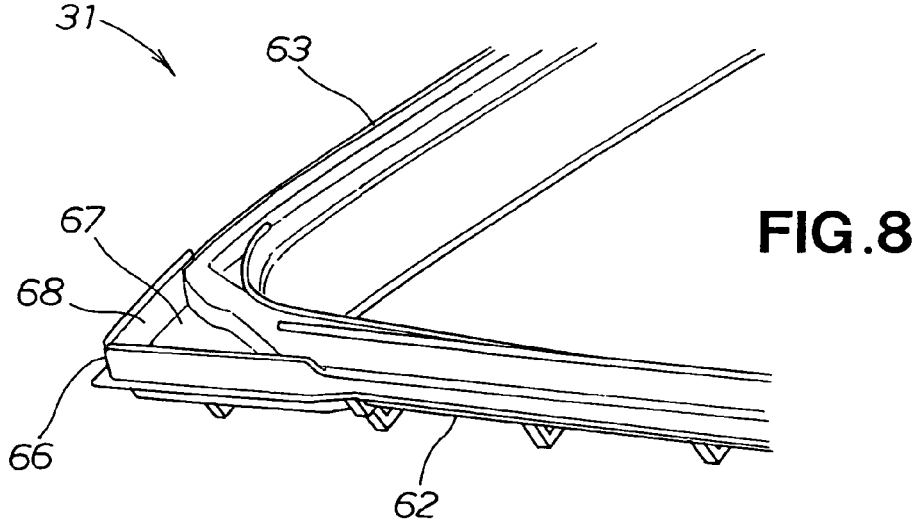
FIG. 8 is a perspective view of the sealing member employed in the vehicle door structure shown in FIG. 2.

FIG. 7 is a side view of the sealing member 31 of the vehicle door structure shown in FIG. 2, and FIG. 8 is a perspective view of the sealing member 31 of the vehicle door structure shown in FIG. 2. As shown in FIG. 7, the sealing member 31, as shown in FIG. 7, is in the form of a frame of a generally rectangular shape formed of an elastic material and provided on the rear vertical sash section 35 defining the rear space 24, the upper sash section 36 and the door body 21. The sealing member 31 includes: a front frame section 61 fitted in the front vertical sash section 34; a rear frame section 62 fitted in the rear vertical sash section 35; an upper frame section 63 formed integrally with and spanning between the respective upper ends of the front and rear frame sections 61 and 62 and fitted in the upper sash section 36; a lower frame section 64 formed integrally with and spanning between the respective lower ends of the front and rear frame sections 61 and 62; a groove section 65 having the quarter glass (fixed door glass) 26 fitted therein as shown in FIGS. 4 and 5; and a recessed section 67 formed in a corner portion 66 defined between the rear frame section 62 and the upper frame section 63 and shaped so that at least a distal end portion (i.e., part of the projection portion 52 and the claw portion 53) of the engaging section 46 of the garnish 28 is received therein as shown in FIG. 8.

As shown in FIG. 4, the sealing member 31 further includes an abutment section 68 located above the engaging section 46 and abutting against the upper sash section 36. Further, as shown in FIGS. 3 and 8, the recessed section 67 is formed in a substantially triangular shape across a connecting portion 37 between the rear vertical sash section 35 and the upper sash section 36.

With the recessed section 67 formed in the sealing member 31 for receiving the engaging section 46, the instant embodiment can prevent interference between the engaging section 46 and the sealing member 31 and thereby secure stable engagement between the door sash 22 and the garnish 28.

Further, with the recessed section 67 formed in a substantially triangular shape across the connecting portion 37 between the rear vertical sash section 35 and the upper sash section 36, the instant embodiment can reliably prevent interference between the engaging section 46 and the sealing member 31 even when an assembling deviation has occurred.

Furthermore, because the abutment section 68 abuts against the upper sash section 36 above the engaging section 46, the instant embodiment can secure sealability between the door sash 22 and the garnish 28 despite the provision of the engaging section 46 on the extension section 42 of the garnish 28.

Namely, the instant embodiment of the vehicle door structure, as shown in FIGS. 2-4, comprises the door body 21 openably and closably mounted to the vehicle body 11, the door sash 22 provided on the door body 21, and the garnish 28 provided on the door sash 22. The door sash 22 includes the vertical sash section 35 extending in the vertical direction of the door body 21, and the upper sash section 36 formed continuously with an upper end portion of the vertical sash section 35 and bent relative to the vertical sash section 35. Further, the garnish 28 includes the base section 41 covering the vertical sash section 35, and the extension section 42 formed continuously with an upper end portion of the base section 41, bent relative to the base section 41 and covering the upper sash section 36.

Furthermore, in the instant embodiment of the vehicle door structure, the base section 41 is fixed to the vertical sash section 35, and the extension section 42 has the engaging section 46 engaging with the upper sash section 36. Thus, even in the case where the garnish 28 has a bent shape, for example, the garnish 28 can be mounted with an enhanced mounting strength because the base section 41 is fixed to the vertical sash section 35 and the engaging section 46 engaging with the upper sash section 36 is provided on the extension section 42, and with a good outer appearance by the extension section 42 being effectively prevented from uplifting from the vertical sash section 35.

Whereas the vehicle door structure of the present invention has been described above in relation to the case where the engaging section 46 of the garnish 28 is provided on the extension section 42 adjacent to the corner portion defined between the base section 41 and the extension section 42, the present invention is not so limited, and the engaging section 46 may be provided at a distal end portion of the extension section 42.

The vehicle door structure of the present invention is well suited for application to passenger cars of a sedan type, wagon type, etc.

What is claimed is:

1. A vehicle door structure comprising:
   a door body openably and closably mounted to a vehicle body;
   a door sash provided on the door body, the door sash including a vertical sash section extending in a vertical direction of the door body, and an upper sash section formed continuously with an upper end portion of the vertical sash section and comprising a bent section bent relative to the vertical sash section;
   a garnish provided on the door sash, the garnish including a base section fixed to the vertical sash section to cover the vertical sash section, an extension section formed continuously with an upper end portion of the base section, bent relative to the base section and covering the upper sash section, and an engaging section provided on the extension section and engaging with the upper sash section and a fitting section provided on an inner surface of the base section and fitting with the vertical sash section, wherein the fitting section has a plurality of opposed engaging tabs formed thereon for engaging a wall of the vertical sash section, and for retaining the fitting section in place therein, wherein the plurality of opposed engaging tabs are spaced apart from the engaging section;
   wherein the door sash further includes a sealing member not only mounting therein a fixed door glass but also sealing the fixed door glass, and the sealing member has a recessed section formed therein and having at least a distal end portion of the engaging section received therein, and
   wherein the engaging section is substantially L-shaped and includes a projection portion projecting, in a width direction of the vehicle, body toward the upper sash section, and a claw portion bent upwardly, in a height direction of the vehicle body, from the projection portion toward the upper sash section, the projection portion is formed in spaced apart relation to the upper sash section, and the engaging section engages with the upper sash section in such a manner that the claw portion abuts against an inner surface of the bent section of the upper sash section.

2. The vehicle door structure of claim 1, wherein the engaging section is provided on the extension section adjacent to a corner portion defined between the base section and the extension section.

3. The vehicle door structure of claim 1, wherein the recessed section is a generally triangular shape across a connecting portion between the vertical sash section and the upper sash section.

4. The vehicle door structure of claim 1, wherein the sealing member abuts against the upper sash section above the engaging section.

5. A vehicle door structure comprising:
   a door body openably and closably mounted to a vehicle body;
   a door sash provided on the door body, the door sash including a vertical sash section extending in a vertical direction of the door body, and an upper sash section formed continuously with an upper end portion of the vertical sash section and comprising a bent section bent relative to the vertical sash section; and
   a garnish provided on the door sash, the garnish comprising a main plate portion and two opposed edge portions which are turned inwardly in relation to the main portion, the garnish including:

a base section fixed to the vertical sash section to cover the vertical sash section, an extension section formed continuously with an upper end portion of the base section, bent relative to the base section and covering at least part of the upper sash section, an engaging section provided on an inner surface of the plate portion on the extension section and engaging with the upper sash section, and a fitting section provided on the inner surface of the plate portion on the base section and fitting with the vertical sash section, wherein the fitting section has a plurality of opposed engaging tabs formed thereon for engaging a wall of the vertical sash section, and for retaining the fitting section in place therein wherein the engaging section is substantially L-shaped and includes a projection portion projecting, in a width direction of the vehicle body, toward the upper sash section, and a claw portion bent upwardly, in a height direction of the vehicle body, from the projection portion toward the upper sash section, and wherein the projection portion is spaced apart from the upper sash section, and the engaging section engages with the upper sash section in such a manner that the claw portion abuts against an inner surface of the bent section of the upper sash section, and wherein the plurality of opposed engaging tabs are spaced apart from the engaging section.

6. The vehicle door structure of claim 5, wherein the door sash further includes a sealing member not only mounting therein a fixed door glass but also sealing the fixed door glass, and the sealing member has a recessed section formed therein and having at least a distal end portion of the engaging section received therein.

7. The vehicle door structure of claim 6, wherein the recessed section is a generally rectangular shape across a connecting portion between the vertical sash section and the upper sash section.

8. The vehicle door structure of claim 6, wherein the sealing member abuts against the upper sash section above the engaging section of the garnish.

* * * * *